(12) United States Patent
He et al.

(10) Patent No.: US 12,075,395 B2
(45) Date of Patent: Aug. 27, 2024

(54) WIRELESS COMMUNICATION METHOD AND DEVICE

(71) Applicant: GUANGDONG OPPO MOBILE TELECOMMUNICATIONS CORP., LTD., Guangdong (CN)

(72) Inventors: Chuanfeng He, Guangdong (CN); Zuomin Wu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 482 days.

(21) Appl. No.: 17/370,137

(22) Filed: Jul. 8, 2021

(65) Prior Publication Data

US 2021/0345332 A1    Nov. 4, 2021

Related U.S. Application Data

(63) Continuation of application No. PCT/CN2019/072248, filed on Jan. 17, 2019.

(51) Int. Cl.
| | |
|---|---|
| *H04W 72/04* | (2023.01) |
| *H04W 16/14* | (2009.01) |
| *H04W 24/02* | (2009.01) |
| *H04W 24/10* | (2009.01) |
| *H04W 72/0453* | (2023.01) |
| *H04W 74/0833* | (2024.01) |

(52) U.S. Cl.
CPC ....... *H04W 72/0453* (2013.01); *H04W 16/14* (2013.01); *H04W 24/02* (2013.01); *H04W 24/10* (2013.01); *H04W 74/0833* (2013.01)

(58) Field of Classification Search
None
See application file for complete search history.

(56) References Cited

U.S. PATENT DOCUMENTS

| | | | |
|---|---|---|---|
| 2016/0278074 A1* | 9/2016 | Yang | H04L 1/1812 |
| 2022/0030623 A1* | 1/2022 | Wang | H04W 24/08 |

FOREIGN PATENT DOCUMENTS

| | | |
|---|---|---|
| CN | 104540230 A | 4/2015 |
| CN | 105722097 A | 6/2016 |
| CN | 107889130 A | 4/2018 |

OTHER PUBLICATIONS

Examination Report for European Application No. 19910019.9 issued Feb. 6, 2023. 8 pages.

(Continued)

*Primary Examiner* — Kouroush Mohebbi
(74) *Attorney, Agent, or Firm* — Perkins Coie LLP

(57) ABSTRACT

Provided are a wireless communication method and device. The method comprises: a terminal device determines a carrier using a licensed spectrum or a carrier using an unlicensed spectrum as a target uplink carrier; the terminal device sends a target uplink channel on the target uplink carrier. According to implementations of the present application, after determining a carrier using a licensed spectrum or a carrier using an unlicensed spectrum as a target uplink carrier, the terminal device sends a target uplink channel on the target uplink carrier, which can support to send the uplink channel on a carrier using an unlicensed spectrum or a carrier using a licensed spectrum.

10 Claims, 5 Drawing Sheets

(56) References Cited

OTHER PUBLICATIONS

Second Office Action for Chinese Application No. 202110917252.0 issued Jan. 19, 2023. 16 pages with English translation.
Examination Report for European Application No. 19910019.9 Issued Jun. 28, 2023, 7 pages.
3GPP TS 38.212 V15.2.0 (Jun. 2018)—3rd Generation Partnership Project; Technical Specification Group Radio Access Network; NR; Multiplexing and channel coding (Release 15) (98 pages).
3GPP TS 38.321 V15.2.0 (Jun. 2018)—3rd Generation Partnership Project; Technical Specification Group Radio Access Network; NR; Medium Access Control (MAC) protocol specification (Release 15) (73 pages).
3GPP TS 38.331 V15.2.1 (Jun. 2018)—3rd Generation Partnership Project; Technical Specification Group Radio Access Network; NR; Radio Resource Control (RRC) protocol specification (Release 15) (303 pages).
International Search Report issued Apr. 28, 2019 of PCT/CN2019/072248 (4 pages).
Examination Report for European Application No. 19910019.9 issued Sep. 14, 2022. 8 pages.
First Office Action for Chinese Application No. 202110917252.0 issued Nov. 30, 2022. 19 pages with English translation.
MediaTek Inc. "Mobility in NR-U Stand Alone (SA)" Tdoc R2-1816481; 3GPP TSG-RAN2 #104 Meeting; Spokane, USA; Nov. 12-16, 2018. 4 pages.
OPPO "System information handling and paging operation in NR-U" R2-1811069; 3GPP TSG-RAN WG2 Meeting #103; Gothenberg, Sweden; Aug. 20-24, 2018. 3 pages.
Apple, Inc. "Assisted NR-U Cell" R2-1817469; 3GPP TSG-RAN WG2 Meeting #104; Spokane, USA, Nov. 12-16, 2018. 4 pages.
Extended European Search Report for European Application No. 19910019.9 issued Dec. 7, 2021. 9 pages.
MediaTek Inc. "Cell Selection and Reselection in NR-U" 3GPP TSG-RAN2 Meeting #104; Spokane, USA; Nov. 12-16, 2018. 4 pages.
OPPO "Discussion on Control, Plane Issues for NR-U" R2-1806701; 3GPP TSG-RAN2 Meeting #102; Busan, Korea, May 21-25, 2018. 3 pages.
Fourth Office Action of the European application No. 19910019.9, issued on Nov. 21, 2023. 7 pages.
Examination report of European application No. 19910019.9 issued on Apr. 25, 2024, 5 pages.

* cited by examiner

WIRELESS COMMUNICATION METHOD AND DEVICE

CROSS-REFERENCE TO RELATED APPLICATIONS

The present application is a continuation application of International PCT Application No. PCT/CN2019/072248, having an international filing date of Jan. 17, 2019. The content of the above-identified application is hereby incorporated by reference.

TECHNICAL FIELD

Implementations of the present application relate to the field of communications, and more particularly, to a wireless communication method and device.

BACKGROUND

Unlicensed spectrum is a spectrum classified by countries and regions that can be used for communication of radio devices. This spectrum is generally regarded as a shared spectrum, that is, communication devices in different communication systems can use this spectrum without applying for exclusive spectrum authority from the government, as long as they meet the regulatory requirements set by countries or regions on this spectrum. For example, in some regions, a communication device follows "Listen Before Talk (LBT)" principle, that is, before transmitting signals on a channel of the unlicensed spectrum, the communication device needs to perform channel listening first, and the communication device can transmit signals only when the result of channel listening is that the channel is idle. If the result of channel listening by the communication device on an unlicensed spectrum channel is that the channel is busy, the communication device cannot transmit signals. With the development of wireless communication technology, both LTE system and NR system will consider to perform deployment on the unlicensed spectrum to perform transmission of data business by using the unlicensed spectrum.

That is, an uplink carrier may include a carrier of an unlicensed spectrum and a carrier of a licensed spectrum.

However, in related technologies, a terminal device only supports to perform random access through the carrier of the licensed spectrum, causing low random access performance.

SUMMARY

A wireless communication method and device are provided, which can improve information transmission efficiency, for example, random access performance, especially random access performance of Scenario D of NR-U.

In a first aspect, a wireless communication method is provided, including: determining, by a terminal device, a carrier using a licensed spectrum or a carrier using an unlicensed spectrum as a target uplink carrier; and sending, by the terminal device, a target uplink channel on the target uplink carrier.

In a second aspect, a wireless communication method is provided, including: determining, by a network device, a carrier using a licensed spectrum or a carrier using an unlicensed spectrum as a target uplink carrier; and receiving, by the network device, a target uplink channel sent by a terminal device on the target uplink carrier.

In a third aspect, a terminal device is provided, configured to perform the method in the first aspect or each implementation thereof. Specifically, the terminal device includes function modules for performing the method in the above first aspect or each implementation thereof.

In a fourth aspect, a network device is provided, configured to perform the method in the above second aspect or each implementation thereof. Specifically, the network device includes function modules for performing the method in the above second aspect or each implementation thereof.

In a fifth aspect, a terminal device is provided, including a processor and a memory. The memory is configured to store a computer program, and the processor is configured to call and run the computer program stored in the memory to perform the method in the above first aspect or each implementation thereof.

In a sixth aspect, a network device is provided, including a processor and a memory. The memory is configured to store a computer program, and the processor is configured to call and run the computer program stored in the memory to perform the method in the above second aspect or each implementation thereof.

In a seventh aspect, a chip is provided, and configured to implement the method in any one of the above first to second aspects or each implementation thereof. Specifically, the chip includes: a processor configured to call and run a computer program from a memory, to enable a device disposed with the chip to perform the method in any one of the above first to second aspects or each implementation thereof.

In an eighth aspect, a computer-readable storage medium is provided, configured to store a computer program, wherein the computer program enables a computer to perform the method in any one of the above first to second aspects or each implementation thereof.

In a ninth aspect, a computer program product is provided, including computer program instructions that enable a computer to perform the method in any one of the above first to second aspects or each implementation thereof.

In a tenth aspect, a computer program is provided, which, when run on a computer, enables the computer to perform the method in any one of the above first to second aspects or each implementation thereof.

Based on the above technical solution, a terminal device can send a target uplink channel, such as a random access channel, on a carrier using a licensed spectrum or a carrier using a unlicensed spectrum, so that the terminal device may not only consider coverage ratio of the carrier but also consider influence of the channel availability factor of the unlicensed spectrum on the uplink random access, thereby capable of improving the random access performance, especially capable of improving the random access performance of the Scenario D of the NR-U.

DETAILED DESCRIPTION

Technical solutions in the present application will be described below with reference to the accompanying drawings.

Figure 1:
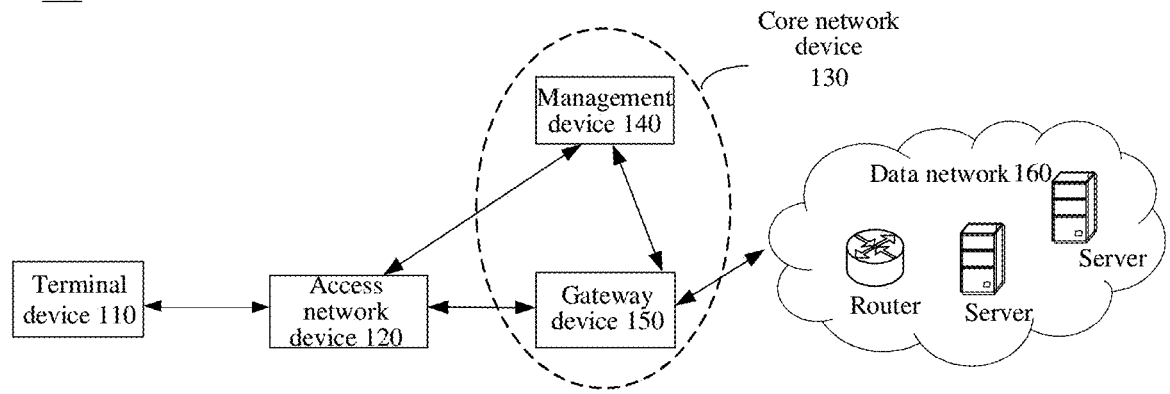
FIG. 1 is an exemplary block diagram of a communication system according to an implementation of the present application.

FIG. 1 is a schematic block diagram of a wireless communication system architecture 100 according to the present application. As shown in FIG. 1, the system architecture 100 includes a terminal device 110, an access network device 120, a core network device 130 and a data network (DN) 160, wherein the core network device 130 includes a management device 140 and a gateway device 150.

The terminal device 110 may be used to connect to the access network device 120 deployed by an operator through a radio air interface, and then to connect to the data network 160 through the core network device 130. The access network device 120 is mainly used for realizing functions, such as a radio physical layer function, resource scheduling and radio resource management, radio access control, and mobility management. The core network device 130 may contain the management device 140 and the gateway device 150. The management device 140 is mainly used for device registration, security authentication, mobility management and location management of the terminal device, and the gateway device 150 is mainly used for establishing a channel with the terminal device, and forward data packets between the terminal device and an external data network on the channel. The data network 160 may correspond to a plurality of different business domains, such as an IP multimedia subsystem (IMS), Internet, Internet protocol television (IPTV), other operator business domains, and is mainly used for providing a plurality of data business services for the terminal device, and may contain a network device such as a server (including a server providing the multicast service), a router, a gateway. For example, for a terminal expected to receive IP multicast service data packets, it is needed to request to add/remove a multicast IP address corresponding to a certain multicast service through a group management protocol so as to start receiving/ending the multicast service. The group management protocol of the IP multicast includes an IGMP protocol in the IPv4, and an MLD protocol in the IPv6.

It should be noted that FIG. 1 is only an exemplary architecture diagram. In addition to functional units shown in FIG. 1, the network architecture may further include other functional units or functional entities, which is not limited by implementations of the present application.

For example, the communication network shown in FIG. 1 is a 5G network communication system.

The above terminal device may be a user equipment (UE). For example, a mobile phone and a computer, or the above terminal device may be a cellular phone, a cordless phone, a session initiation protocol (SIP) phone, a smart phone, a wireless local loop (WLL) station, a personal digital assistant (PDA), a computer, a laptop computer, a handheld communication device, a handheld computing device, a satellite wireless device, a wireless modem card, a set top box (STB), a customer premise equipment (CPE) and/or any other device for communicating on a wireless system.

The access network device may be an access network (AN)/radio access network (RAN) device. Multiple 5G-AN/5G-RAN nodes form a network, and the 5G-AN/5G-RAN node may be an access point (AP), a next generation base station (NR NodeB, gNB), a gNB in which a central unit (CU) and a distributed unit (DU) are in a separate state, a transmission receive point (TRP), a transmission point (TP) or another access node.

The above core network device may include an access & mobility function (AMF), a session management function (SMF), a policy control function (PCF), a user plane function (UPF) and other functional units, these functional units may work independently or be combined together to realize some control functions. For example, the AMF, SMF and PCF may be combined together as a management device to complete the access control and mobility management function such as access authentication, security encryption and location registration of the terminal device, and the session management function such as establishment, release and modification of a user plane transmission path, and functions of analyzing some slice-related data (such as congestion) and terminal device-related data, and routing and forwarding function for user plane data and the like mainly completed by the UPF as a gateway device, such as responsible for filtering data packets of the terminal device, data transmission/forwarding, rate control and generating charging information.

Figure 2:
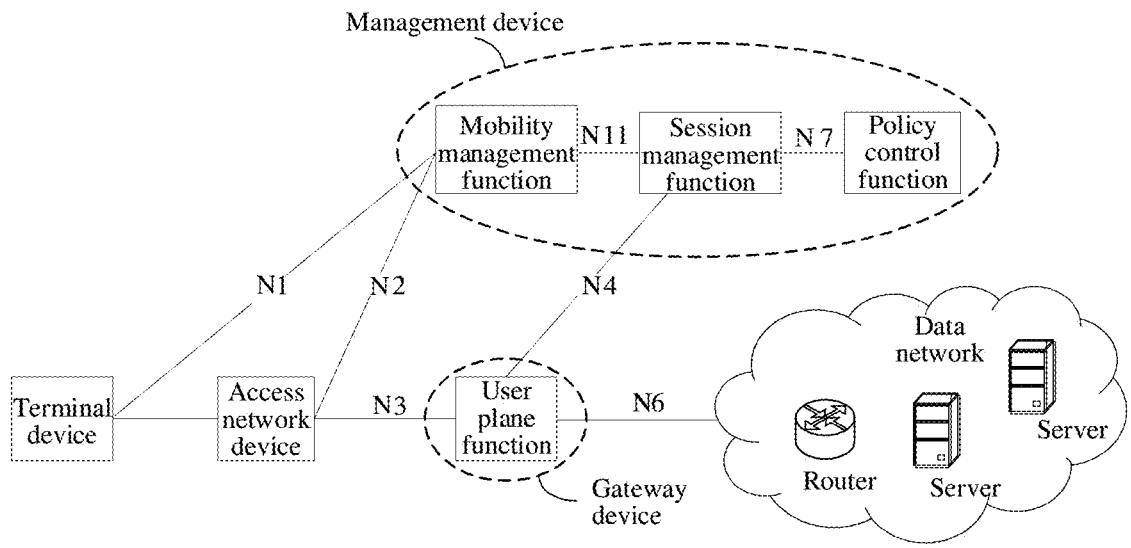
FIG. 2 is an exemplary block diagram of a 5G communication system according to an implementation of the present application.

FIG. 2 is a schematic diagram of a 5G network architecture provided by an implementation of the present application. In the 5G network shown in FIG. 2, various functional units may establish connections therebetween through next generation (NG) interfaces to realize communication. For example, a terminal device establishes an air interface connection with an RAN device through a new radio (NR) interface to transmit user plane data and control plane signaling; the terminal device may establish a control plane signaling connection with the AMF through an NG interface 1 (N1 for short); an AN/RAN device, such as a next generation radio access base station (NR NodeB, gNB), may establish a user plane data connection with the UPF through an NG interface 3 (N3 for short); the AN/RAN device may establish a control plane signaling connection with the AMF through an NG interface 2 (N2 for short); a UPF may establish a control plane signaling connection with the SMF through an NG interface 4 (N4 for short); the UPF may exchange user plane data with the data network through an NG interface 6 (N6 for short); an AMF may establish a control plane signaling connection with an SMF through an NG interface 11 (N11 for short); and the SMF may establish a control plane signaling connection with a PCF through an NG interface 7 (N7 for short). It should be noted that FIG. 2 is only an exemplary architecture diagram. In addition to functional units shown in FIG. 2, the network architecture may further include other functional units or functional entities, for example, a core network device may further contain other functional units such as unified data management (UDM), which is not limited by implementations of the present invention.

It should be understood that the terms "system" and "network" herein are often used interchangeably in this document. The term "and/or" in this document is merely an association relationship describing associated objects, indicating that there may be three relationships, for example, A and/or B may indicate three cases: A alone, both of A and B, and B alone. In addition, the symbol "/" in this document generally indicates that objects before and after the symbol "/" have an "or" relationship.

In the system architectures shown in FIG. 1 and FIG. 2, the terminal device may use a carrier of an unlicensed spectrum or a carrier of a licensed spectrum to perform data transmission. The unlicensed spectrum is a spectrum classified by countries and regions that can be used for communication of radio devices. This spectrum is generally regarded as a shared spectrum, that is, communication devices in different communication systems can use this spectrum without applying for exclusive spectrum authority from the government, as long as they meet the regulatory requirements set by the countries or regions on this spectrum. For example, in some regions, a communication device follow "Listen Before Talk (LBT)" principle, that is, before transmitting signals on a channel of the unlicensed spectrum, the communication device needs to perform channel listening first, and the communication device can transmit signals only when the result of channel listening is that the channel is idle. If the result of channel listening by the communication device on an unlicensed spectrum channel is that the channel is busy, the communication device cannot transmit signals. With the development of wireless communication technology, both the LTE system and the NR system will consider to perform deployment on the unlicensed spectrum to perform data business transmission using the unlicensed spectrum.

Figure 3:
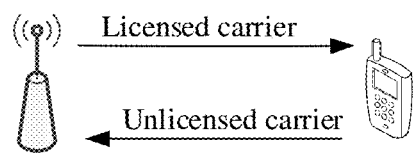
FIG. 3 is an example of application scenario according to implementation of the present application.
Figure 4:
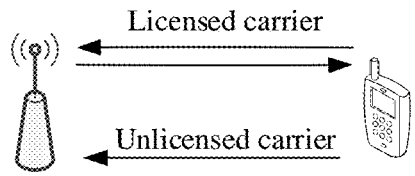
FIG. 4 is an example of application scenario according to implementation of the present application.
Figure 5:
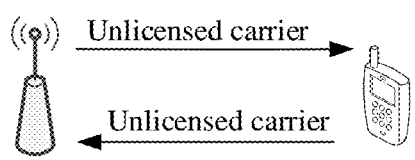
FIG. 5 is an example of application scenario according to implementation of the present application.

FIGS. 3 to 5 are examples of application scenarios according to implementations of the present application.

At the meeting of 3GPP RAN#82, a new work item "NR-based access to unlicensed spectrum" was allowed, that is, using the NR technology to access on the unlicensed spectrum, referred to as NR-U for short. The deployment scenarios defined in this work item include two categories: Standalone (SA) and Non Standalone (NSA). The SA includes a new Scenario D, and the Scenario D is stand-alone NR on an unlicensed carrier (a stand-alone NR cell in unlicensed band and UL in licensed band, NR-U). In this scenario, as shown in FIG. 3 and FIG. 4, a downlink carrier of the cell is realized through the unlicensed spectrum, while an uplink carrier may be realized through both the unlicensed spectrum and the licensed spectrum, or only through the licensed spectrum. A scenario similar to the Scenario D futher includes Scenario C, that is, stand-alone NR-U. As shown in FIG. 5, both downlink carrier and uplink carrier of a cell under the Scenario C are realized through the unlicensed spectrum.

In addition, in the systems shown in FIG. 1 and FIG. 2, a Supplement Uplink (SUL) carrier may further be introduced to enhance uplink coverage. The SUL carrier may not correspond to one cell alone, for example, the SUL carrier may be paired with an uplink carrier that is non-SUL carrier to correspond to an uplink carrier of one cell. That is similar to the Scenario D of NR-U, that is, there is a licensed uplink carrier, such as the SUL carrier, on the basis of the unlicensed spectrum. If a network is configured with an SUL carrier, a terminal device may select to initiate a random access on a non-SUL carrier or an SUL carrier according to a measurement result of a downlink carrier. If considering that the SUL has a better coverage, the terminal device may decide to initiate an access procedure on a PRACH resource of the non-SUL or SUL carrier according to a downlink RSRP result. Specifically, after detecting a cell, the terminal device acquires system information, and if the system information contains configuration of the SUL, the terminal device may select the PRACH resource of the non-SUL or SUL carrier to initiate an access according to the downlink measurement result, such as RSRP.

For a cell deployed with the SA of the NR-U, the network sends initial access related information on the unlicensed spectrum, including a synchronization signal, a MIB and a SIB, etc. For the terminal device, it is needed to acquire PRACH resource information after the synchronization signal, MIB and SIB are received, so as to send a PRACH on the uplink carrier to complete the initial access procedure. However, in the Scenario C and Scenario D of the NR-U scenario, the system information is received through the carrier of the unlicensed spectrum in downlink, while in uplink there may be two types of spectrums that may be used. That is to say, under NR-U deployment, the terminal device cannot effectively distinguish the Scenario C from the Scenario D, that is, the terminal device may initiate an random access on a carrier using a licensed spectrum or on a carrier using an unlicensed spectrum, but the terminal device does not know on which type of the carrier the random access is initiated. If the terminal device still determines an uplink carrier on which the random access is initiated through a downlink RSRP measurement result, random access performance will be degraded.

Specifically, in the NR-U scenario, the uplink carrier includes the carrier using the unlicensed spectrum and the carrier using the licensed spectrum. In addition to according to the RSRP measurement result, it is also needed to consider influence of a channel availability factor of the unlicensed spectrum on the uplink random access, which is different from a situation in which downlink and uplink carriers are all licensed spectrum in the NR scenario. If the uplink carrier initiating the random access is determined through the downlink RSRP measurement result, only the coverage ratio of the carrier is considered without considering the influence of the channel availability factor of the unlicensed spectrum on uplink random access, the random access performance will be degraded, especially causing the random access performance of the Scenario D of the NR-U to be degraded.

That is to say, the uplink carrier of the terminal device may include the carrier using the unlicensed spectrum and the carrier using the licensed spectrum. However, in the related technologies, the terminal device only considers the coverage ratio of the carrier, but does not consider the influence of the channel availability factor of the unlicensed spectrum on the uplink random access, so the random access performance will be degraded, especially causing the random access performance of the Scenario D of the NR-U to be degraded.

An implementation of the present application provides a wireless communication method, in which a terminal device can send a target uplink channel, such as a random access channel, on a carrier using a licensed spectrum or a carrier using an unlicensed spectrum, so that the terminal device may not only consider the coverage ratio of the carrier but also consider the influence of the channel availability factor of the unlicensed spectrum on the uplink random access, thereby improving the random access performance, especially capable of improving the random access performance of the Scenario D of the NR-U.

Figure 6:
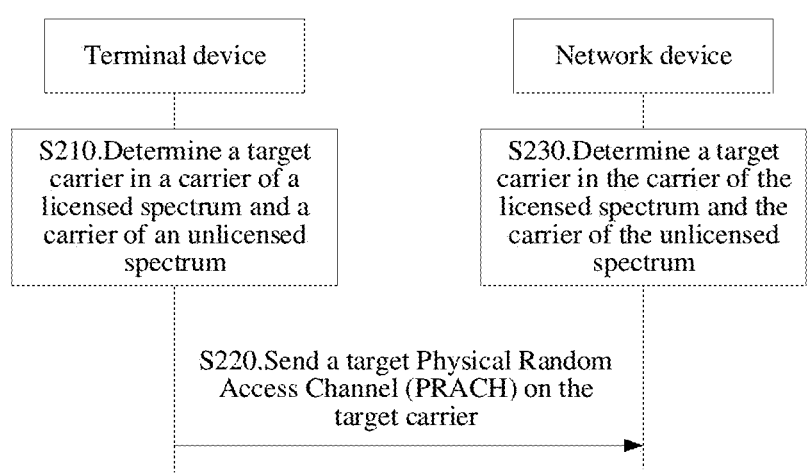
FIG. 6 is a schematic flowchart of wireless communication method according to implementation of the present application.

FIG. 6 shows a schematic flowchart of a wireless communication method 200 according to an implementation of the present application, and an implementing subject of the method 200 involves a terminal device and a network device. For convenience of description, the wireless communication method of the implementation of the present application will be described in detail from a perspective of the terminal device. It should be understood that the terminal device shown in FIG. 6 may be the terminal device as shown in FIG. 1 or FIG. 2, and the network device shown in FIG. 6 may be the access network device as shown in FIG. 1 or FIG. 2. However, the implementations of the present application are not limited thereto.

As shown in FIG. 6, the method 200 includes acts S210 and S220.

In act S210, a terminal device determines a carrier using a licensed spectrum or a carrier using an unlicensed spectrum as a target uplink carrier.

In S220, the terminal device sends a target uplink channel on the target uplink carrier.

Specifically, the terminal device determines the carrier using the licensed spectrum as the target uplink carrier and sends the target uplink channel on the target uplink carrier; or the terminal device determines the carrier using the unlicensed spectrum as the target uplink carrier, and sends the target uplink channel on the target uplink carrier. At a network device side, a network device may determine the carrier using the licensed spectrum as the target uplink carrier, and the network device receives the target uplink channel sent by the terminal device on the target uplink carrier; or the network device may determine the carrier using the unlicensed spectrum as the target uplink carrier, or the network device receives the target uplink channel sent by the terminal device on the target uplink carrier.

The target uplink channel may include at least one of the following channels: a Physical Random Access Channel (PRACH), a Physical Uplink Control channel (PUCCH), a Physical Uplink Shared channel (PUSCH), a Scheduling Request (SR), and an uplink reference signal, etc. The uplink reference signal may include an uplink Demodulation Reference Signal (DMRS), a Sounding Reference Signal (SRS), and a Phase Tracking Reference Signal (PT-RS), etc. The uplink DMRS may be used for uplink channel demodulation, the SRS may be used for uplink channel measurement, uplink time-frequency synchronization or phase tracking, and the PT-RS may also be used for uplink channel measurement, uplink time-frequency synchronization or phase tracking.

It should be understood that implementations of the present application may include uplink physical channels or uplink reference signals with same names as above and different functions from above, and may also include uplink physical channels or uplink reference signals with different names from above and same functions as above, and this is not limited by the present application.

In the method according to an implementation of the present application, the terminal device can send the target uplink channel, such as a random access channel, on the carrier using the licensed spectrum or the carrier using the unlicensed spectrum, so that the terminal device may not only consider the coverage ratio of the carrier but also consider the influence of the channel availability factor of the unlicensed spectrum on the uplink random access, thereby capable of improving the random access performance, especially capable of improving the random access performance of the Scenario D of the NR-U.

In an implementation of the present application, when the terminal device determines the target carrier, the terminal device may determine the target carrier based on the coverage ratio and/or availability of the carrier using the licensed spectrum, or based on the coverage ratio and/or availability of the carrier using the unlicensed spectrum, or by combining the coverage ratio and/or availability of the carrier using the licensed spectrum with the coverage ratio and/or availability of the carrier using the unlicensed spectrum, which can effectively improve transmission efficiency of the target uplink channel. For example, when the target uplink channel is a physical random access channel, the random access performance, especially the random access performance of the Scenario D of the NR-U, can be improved.

As shown in FIG. 2, the method 200 may further include act S230.

In act S230, a network device determines the carrier using the licensed spectrum or the carrier using the unlicensed spectrum as the target uplink carrier, to receive the target uplink channel sent by the terminal device on the target uplink carrier.

It should be understood that the implementation mode of determining the target uplink carrier by the network device is similar to the implementation of determining the target uplink carrier by the terminal device. To avoid repetition, an implementation of determining the target uplink carrier according to an implementation of the present application will be described in detail below by taking the implementation mode of determining the target uplink carrier by the terminal device as an example.

Implementation one

Optionally, the terminal device determines the target uplink carrier according to a first rule.

The first rule includes a first channel of the carrier using the licensed spectrum and/or a second channel of the carrier using the unlicensed spectrum; and the first channel includes at least one of a PRACH, a PUCCH, an SRS and an SR, and the second channel includes a PUSCH. For example, the first channel includes the target uplink channel; and the terminal device determines the carrier using the licensed spectrum as the target uplink carrier.

Thus, the terminal device may determine a carrier type for sending the target uplink channel according to a type of the target uplink channel and the first rule. For example, assuming that the target uplink channel is a PRACH, the terminal device determines that the carrier type used by the PRACH is the carrier using the licensed spectrum according to the first rule, and the terminal device may determine the carrier using the licensed spectrum as the target uplink carrier, and then may send the PRACH on the target uplink carrier.

Since the LBT is not needed for uplink sending on the licensed carrier, it may be specified that some important or delay-sensitive information, such as PRACH, PUCCH, SRS, SR, etc., is sent on the licensed carrier. For sending of data, such as the PUSCH, it may be sent through an unlicensed carrier or a licensed carrier, that is, the PRACH may be sent through the licensed spectrum, which can ensure that the PRACH can be sent in time on predetermined time-frequency resource and there is no situation in which sending cannot be performed due to the failure of the LBT, thus ensuring the reliability and timeliness of PRACH sending and reducing the delay of PRACH sending.

It should be understood that channel types included in the first channel and the second channel are only an example of the present application, and should not be construed as limitations to the implementations of the present application. For example, in another alternative implementation, the first channel may further include a DMRS and/or a PT-RS, etc.

Optionally, the method 200 may further include: the terminal device receives first indication information, wherein the first indication information is used for indicating that the uplink carrier of the terminal device includes the carrier using the licensed spectrum and the carrier using the unlicensed spectrum.

The network device generates the first indication information and sends the first indication information to the terminal device.

Optionally, the terminal device receives system information, wherein the system information includes the first indication information.

Taking the target uplink channel being a PRACH as an example, assuming that the uplink carrier includes a carrier using a licensed spectrum and a carrier using an unlicensed spectrum, when a network device indicates through the first indication information that the uplink carrier of a terminal device includes the carrier using the licensed spectrum and the carrier using the unlicensed spectrum, the terminal device may initiate a random access using PRACH resource configuration information included in system information on the target uplink carrier after determining the target uplink carrier according to the first rule. The PRACH resource configuration information in the system information may not contain carrier information, or may include carrier information, which is not specifically limited in the implementations of the present application.

For example, the PRACH resource configuration information may follow the existing random access channel configuration mode, that is, the PRACH resource configuration information may be common radio resource configuration information (RACH-ConfigCommon).

For another example, the resource configuration information of the target uplink channel may include resource configuration information of the carrier using the unlicensed spectrum and resource configuration information of the carrier using the licensed spectrum. When the resource configuration information of the carrier using the unlicensed spectrum is the same as that of the carrier using the licensed spectrum, the network device only needs to configure one piece of resource configuration information, thus no matter which carrier the terminal device uses, the target uplink channel can be sent in combination with the one piece of resource configuration information. The resource configuration information may include configuration information of a time domain resource and/or configuration information of a frequency domain resource. The configuration information of the time domain resource of the carrier using the unlicensed spectrum may be the same as or different from that of the carrier using the licensed spectrum, which is not specifically limited by the implementations of the present application.

Implementation two

Optionally, the terminal device receives second indication information; and the terminal device determines the target uplink carrier in the carrier using the licensed spectrum and the carrier using the unlicensed spectrum according to the second indication information, wherein the second indication information is used for indicating that the target uplink carrier is the carrier using the licensed spectrum or the carrier using the unlicensed spectrum.

The network device generates the second indication information and sends the second indication information to the terminal device.

Thus, the terminal device may determine a carrier type indicated by the second indication information as the target uplink carrier.

Optionally, the terminal device receives system information sent by the network device, wherein the system information includes the second indication information.

Assuming that a downlink carrier is the carrier using the unlicensed spectrum, and an uplink carrier includes the carrier using the licensed spectrum and the carrier using the unlicensed spectrum. On the downlink carrier, the network device may indicate whether the terminal device should send the target uplink channel on the carrier using the licensed spectrum or the carrier using the unlicensed spectrum by carrying the second indication information in the system information.

A specific implementation mode of indicating by the network device through the system information that the target uplink carrier is the carrier using the licensed spectrum or the carrier using the unlicensed spectrum will be described below.

Optionally, the system information is a master information block (MIB).

In an implementation, the second indication information indicates that the target uplink carrier is the carrier using the licensed spectrum or the carrier using the unlicensed spectrum through a spare bit in occupied bits of the MIB.

Taking the system information being carried on a PBCH as an example, the information carried on the PBCH may include A-bit information from a higher layer and additional 8-bit layer 1 related information, and layer 1 information includes an SFN, a half-frame indicator, an SSB index, etc. Specifically, the information carried on the PBCH includes a MIB from a higher layer, A bits in total, $\bar{a}_0, \bar{a}_1, \bar{a}_2, \bar{a}_3, \ldots, \bar{a}_{\bar{A}-1}$, and 8-bit occupied bits, $\bar{a}_{\bar{A}}, \bar{a}_{\bar{A}+1}, \bar{a}_{\bar{A}+2}, \bar{a}_{\bar{A}+3}, \ldots, \bar{a}_{\bar{A}+7}$, of the layer 1 information. The A-bit MIB includes 6 bits of SFN, 1 bit of subcarrier spacing information, 4 bits of SSB subcarrier offset, DMRS-related information, PDCCH resource information for scheduling SIB, etc., and further includes 1 spare bit. In an implementation of the present application, the second indication information may be carried through the 1 spare bit. For example, when the spare bit is 1, it is indicated that the target uplink carrier is the carrier using the licensed spectrum, and when the spare bit is 0, it is indicated that the target uplink carrier is the carrier using the unlicensed spectrum.

In another implementation, the second indication information indicates that the target uplink carrier is the carrier using the licensed spectrum or the carrier using the unlicensed spectrum through a reserved bit in occupied bits of the layer 1 information of the MIB.

Taking the system information being carried on a PBCH as an example, the information carried on the PBCH may include A-bit information from a higher layer and additional 8-bit layer 1 related information, and the layer 1 related information includes an SFN, a half-frame indicator, an SSB index, etc. Specifically, in the 8 bits of layer 1 $\bar{a}_{\bar{A}}, \bar{a}_{\bar{A}+1}, \bar{a}_{\bar{A}+2}, \bar{a}_{\bar{A}+3}, \ldots, \bar{a}_{\bar{A}+7}, \bar{a}_{\bar{A}}, \bar{a}_{\bar{A}+1}, \bar{a}_{\bar{A}+2}, \bar{a}_{\bar{A}+3}$ are the lowest 4 bits of the SFN. $\bar{a}_{\bar{A}+4}$ is the half-frame indicator; when $L_{SSB}=64$, $\bar{a}_{\bar{A}+5}, \bar{a}_{\bar{A}+6}, \bar{a}_{\bar{A}+7}$ are the highest 3 bits of the SSB index; otherwise, $\bar{a}_{\bar{A}+5}$ is the highest bit of parameter $k_{SSB}$, and $\bar{a}_{\bar{A}+6}, \bar{a}_{\bar{A}+7}$ are reserved bits. $L_{SSB}$ is the maximum number of SSBs, $k_{SSB}$ is subcarrier offset information of the SSBs. When the system frequency band is less than 6 GHz, that is, $L_{SSB}$ is less than 64, the layer 1 related information has two reserved bits. In an implementation of the present application, any one of the two reserved bits may be used for carrying the second indication information. For example, when the spare bit is 1, it is indicated that the target uplink carrier is the carrier using the licensed spectrum, and when the spare bit is 0, it is indicated that the target uplink carrier is the carrier using the unlicensed spectrum.

Optionally, the system information is a system information block (SIB).

In an implementation, the SIB includes configuration information of the target uplink channel, and the configuration information includes the second indication information.

Taking the target uplink channel being a PRACH as an example, PRACH resource configuration information may follow the existing random access channel configuration mode, that is, the SIB may include common radio resource configuration information (RACH-ConfigCommon). In an implementation of the present application, the second indication information may be added to the common radio resource configuration information to indicate carrier information for sending the PRACH, for example, PRACH carrier information (prach-ULunlicensed) is added to the common radio resource configuration information to indicate whether the carrier for sending the PRACH is the carrier using the licensed spectrum or the carrier using the unlicensed spectrum. For example, when the PRACH carrier information is 1, it is indicated that the PRACH is sent on the carrier of the unlicensed spectrum, and when the PRACH carrier information is 0, it is indicated that the PRACH is sent on the carrier of the licensed spectrum.

In an implementation of the present application, the target uplink carrier for sending the target uplink channel is determined through the second indication information, which is beneficial for the network to flexibly control the type of the target uplink carrier, so that the resource load of the two types of carriers can be effectively balanced. When the channel of the carrier of the unlicensed spectrum is relatively busy, for example, a probability of success in Listen Before Talk (LBT) is low, the terminal device may be indicated to send the target uplink channel on the carrier of the licensed spectrum, thereby ensuring the probability of successfully sending the target uplink channel When the channel of the unlicensed carrier is relatively clear, for example, a probability of success in the LBT is high, the terminal device may be indicated to send the target uplink channel on the carrier of the unlicensed spectrum, thereby making full use of the unlicensed spectrum and increasing the uplink throughput.

Implementation Three

Optionally, the terminal device determines the carrier using the unlicensed spectrum as the target uplink carrier.

In other words, assuming that an uplink carrier includes a carrier using a licensed spectrum and a carrier using an unlicensed spectrum, the terminal device preferentially determines the carrier using the unlicensed spectrum as the target uplink carrier.

Further, the terminal device sends the target uplink channel on the target uplink carrier according to a channel access situation of the target uplink carrier. For example, the terminal device sends the target uplink channel on the target uplink carrier when the terminal device performs Listen before Talk (LBT) on the target uplink carrier successfully.

Furthermore, the method 200 may further include: the terminal device re-determines the carrier using the licensed spectrum as the target uplink carrier when a number of failures of the LBT performed by the terminal device on the target uplink carrier is greater than or equal to a first threshold; and the terminal device sends the target uplink channel on the re-determined target uplink carrier. Herein, the first threshold is a preconfigured threshold, or the first threshold is a threshold configured by a network device. For example, the first threshold may be indicated to the terminal device through system information.

Or, the terminal device is switched to the carrier using the licensed spectrum to send the target uplink channel when the number of failures of the LBT performed by the terminal device on the target uplink carrier is greater than or equal to the first threshold.

Specifically, the terminal device first acquires resource configuration information for sending the target uplink channel on the carrier using the unlicensed spectrum. When the terminal device needs to send the target uplink channel, the terminal device preferentially sends the target uplink channel on the carrier using the unlicensed spectrum. Due to the unlicensed spectrum, the terminal device needs to perform the LBT on the target uplink carrier before sending the target uplink channel, and the terminal device may re-determine the target carrier for sending the target uplink channel according to an LBT result. For example, after the LBT performed before sending the target uplink channel on the carrier using the unlicensed spectrum fails, the terminal device is switched to the carrier using the licensed spectrum to send the target uplink channel on a next transmission opportunity of the carrier using the licensed spectrum.

Figure 7:
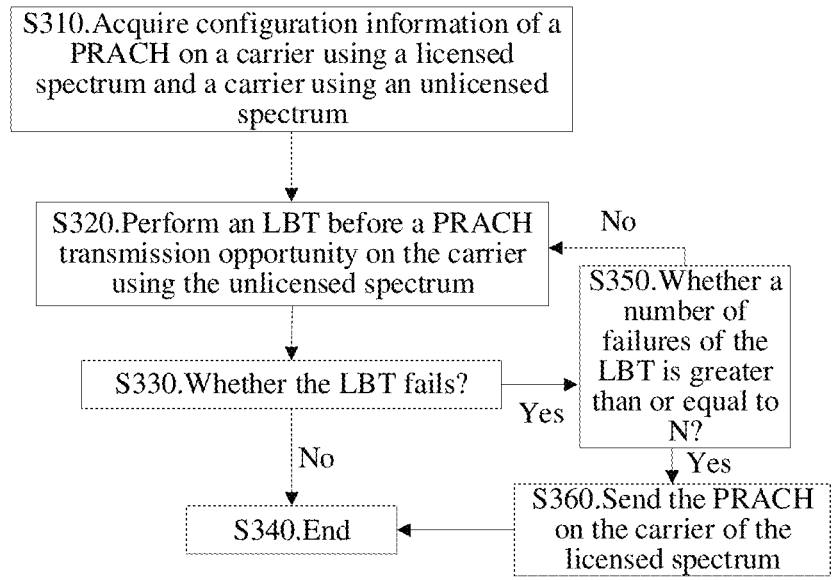
FIG. 7 is a schematic flowchart of wireless communication method according to implementation of the present application.

FIG. 7 is a schematic flowchart of a wireless communication method according to an implementation of the present application.

The wireless communication method according to the implementation of the present application will be described below by taking the target uplink channel being a PRACH as an example.

As shown in FIG. 7, the method 300 may include acts S310-S360.

In act S310, a terminal device acquires configuration information of a PRACH on a carrier using a licensed spectrum and a carrier using an unlicensed spectrum.

In act S320, the terminal device performs an LBT before a PRACH transmission opportunity on the carrier using the unlicensed spectrum.

In act S330, the terminal device determines whether the LBT fails.

In act S340, if the LBT does not fail, the terminal device sends the PRACH on the carrier using the unlicensed spectrum.

In act S350, if the LBT fails, whether the number of failures of the LBT is greater than or equal to a value N is determined, where the value N may be a preconfigured value or a value configured by a network device.

In act S360, if the number of failures of the LBT is greater than N, the terminal device sends the PRACH on the carrier using the licensed spectrum.

Optionally, the method 300 may further include: the terminal device determines the carrier using the unlicensed spectrum as target uplink carrier for sending the target uplink channel next time after successfully sending the target uplink channel on the re-determined target carrier.

That is, the terminal device determines the carrier using the unlicensed spectrum as the target uplink carrier for sending the target uplink channel next time after successfully sending the target uplink channel on the carrier using the licensed spectrum. Taking the target uplink channel being a PRACH as an example, after the terminal device successfully sends the PRACH on the carrier using the licensed spectrum, the terminal device still preferentially determines the carrier using the unlicensed spectrum as the target uplink carrier for sending the PRACH in a next random access procedure.

In an implementation of the present application, the terminal device may dynamically modify the target uplink carrier for sending the target uplink channel according to a channel access situation, thereby making full use of the carrier of the unlicensed spectrum to send the target uplink channel, and at the same time, avoiding increasing a sending delay of the target uplink channel because channel occupation cannot be acquired on the unlicensed carrier for a long time.

Implementation Four

Optionally, the terminal device determines the target uplink carrier according to a channel measurement result of the carrier using the unlicensed spectrum.

Assuming that an uplink carrier includes a carrier using a licensed spectrum and a carrier using an unlicensed spectrum, when the terminal device needs to send the target uplink channel, measurement is performed for channel occupation, for example, a measurement parameter for reflecting the channel occupation is Received Signal Strength Indication (RSSI).

For example, the terminal device determines the target uplink carrier by comparing the RSSI of the carrier using the unlicensed spectrum with a second threshold. The second threshold is a preconfigured threshold, or the second threshold is a threshold configured by a network device.

For example, when the RSSI of the carrier using the unlicensed spectrum is less than the second threshold, the terminal device determines the carrier of the unlicensed spectrum as the target carrier; and/or when the RSSI of the carrier using the unlicensed spectrum is greater than or equal to the second threshold, the terminal device determines the carrier using the licensed spectrum as the target carrier. For another example, when the RSSI of the carrier using the unlicensed spectrum is less than or equal to the second threshold, the terminal device determines the carrier of the unlicensed spectrum as the target carrier; and/or when the RSSI of the carrier using the unlicensed spectrum is greater than the second threshold, the terminal device determines the carrier using the licensed spectrum as the target carrier.

Figure 8:
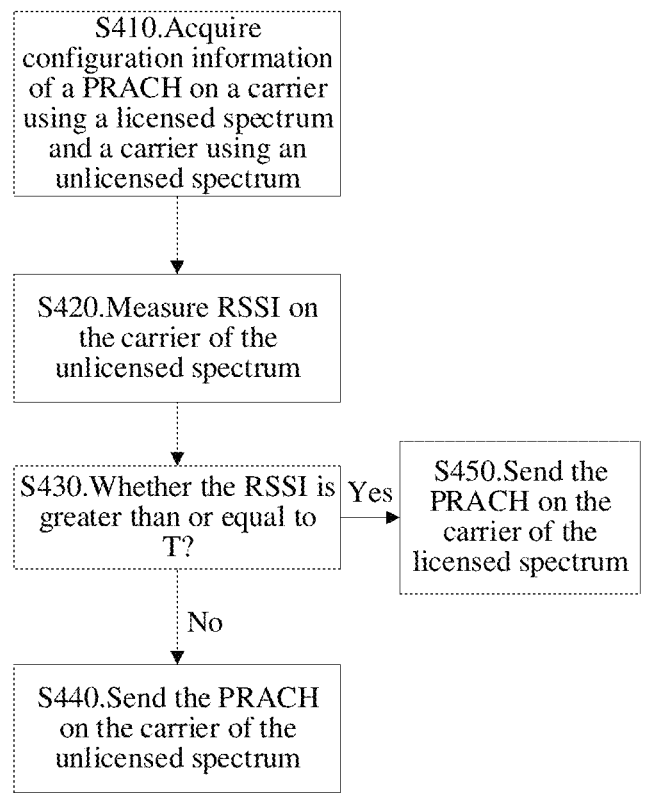
FIG. 8 is a schematic flowchart of wireless communication method according to implementation of the present application.

FIG. 8 is a schematic flowchart of a wireless communication method according to an implementation of the present application.

The wireless communication method according to the implementation of the present application will be described below by taking the target uplink channel being a PRACH as an example.

In S410, a terminal device acquires configuration information of a PRACH on a carrier using a licensed spectrum and a carrier using an unlicensed spectrum.

In S420, the terminal device measures RSSI of the carrier using the unlicensed spectrum.

In S430, the terminal device determines whether the RSSI of the carrier using the unlicensed spectrum is greater than a value T, herein the value T may be a preconfigured value or a value configured by a network device.

In S440, if the RSSI of the carrier using the unlicensed spectrum is less than the value T, the terminal device sends the PRACH on the carrier using the unlicensed spectrum.

In S450, if the RSSI of the carrier using the unlicensed spectrum is greater than or equal to the value T, the terminal device sends the PRACH on the carrier using the unlicensed spectrum.

In an implementation of the present application, a terminal device may determine a channel occupation situation or a condition of a carrier according to a measurement result of the carrier of the unlicensed spectrum so as to dynamically modify a target uplink carrier for sending a target uplink channel, thereby making full use of the carrier of the unlicensed spectrum to send the target uplink channel, and at the same time, avoiding increasing a sending delay of the target uplink channel because channel occupation cannot be acquired on the unlicensed carrier for a long time. The channel occupation situation or condition may be represented by a parameter, such as a channel occupation ratio, or channel occupation time. For example, by measuring the RSSI, a channel state of the carrier using the unlicensed spectrum may be effectively evaluated, and difficulty of acquiring channel occupation or a probability of an LBT failure on the carrier using the unlicensed spectrum may be evaluated, so as to determine whether to send the target uplink channel on the unlicensed carrier.

Implementation Five

Optionally, the terminal device may determine the target uplink carrier by comparing received Reference Signal Receiving Power (RSRP) of the carrier using the unlicensed spectrum with a third threshold. The third threshold is a preconfigured threshold, or the third threshold is a threshold configured by a network device.

For example, when the RSRP of the carrier using the unlicensed spectrum is greater than the third threshold, the terminal device determines the carrier using the unlicensed spectrum as the target carrier; and/or when the RSRP of the carrier using the unlicensed spectrum is less than or equal to the third threshold, the terminal device determines the carrier using the unlicensed spectrum as the target carrier. For another example, when the RSRP of the carrier using the unlicensed spectrum is greater than or equal to the third threshold, the terminal device determines the carrier using the unlicensed spectrum as the target carrier; and/or when the RSRP of the carrier using the unlicensed spectrum is less than the third threshold, the terminal device determines the carrier using the unlicensed spectrum as the target carrier.

It should be understood that this implementation may or may not be combined with Implementation four, which is not specifically limited by the implementations of the present application.

Figure 9:
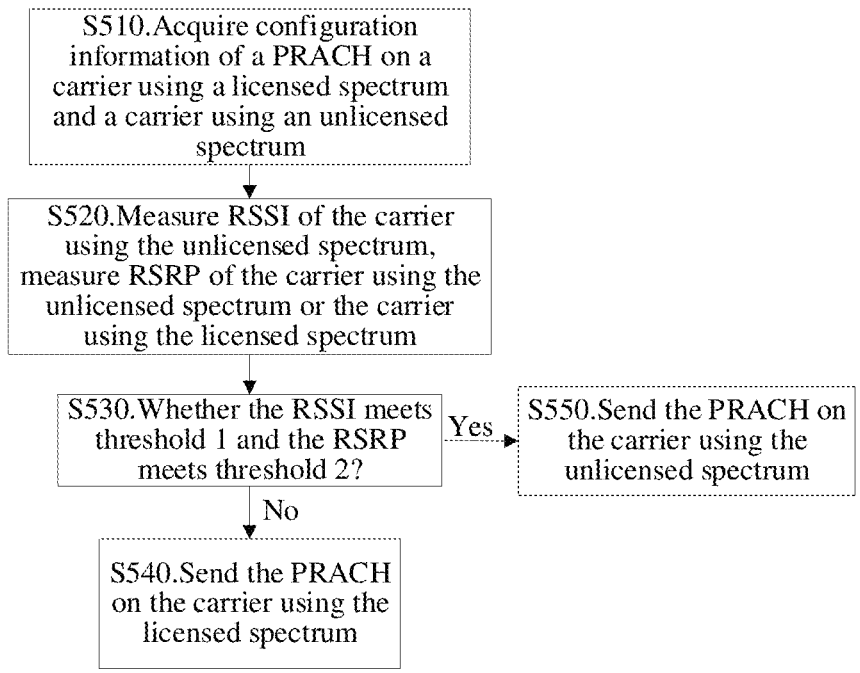
FIG. 9 is a schematic flowchart of wireless communication method according to implementation of the present application.

FIG. 9 is a schematic flowchart of a wireless communication method according to an implementation of the present application.

The wireless communication method according to the implementation of the present application will be described below by taking the target uplink channel being a PRACH as an example.

In S510, a terminal device acquires configuration information of a PRACH on a carrier using a licensed spectrum and a carrier using an unlicensed spectrum.

In S520, the terminal device measures a RSSI of the carrier using the unlicensed spectrum, and measures a RSRP of the carrier using the unlicensed spectrum or the carrier using the licensed spectrum.

In S530, the terminal device determines that the RSSI meets threshold 1 and the RSRP meets threshold 2.

In S540, if the terminal device determines that the RSSI does not meet threshold 1 and/or the RSRP does not meet threshold 2, the terminal device sends the PRACH on the carrier using the licensed spectrum. The threshold 1 and the threshold 2 may be preconfigured thresholds or thresholds configured by a network device.

In S550, if the terminal device determines that the RSSI meets threshold 1 and the RSRP meets threshold 2, the terminal device sends the PRACH on the carrier using the unlicensed spectrum.

In the implementation of the present application, the terminal device comprehensively considers the selected target uplink carrier according to the RSSI measurement result of the unlicensed carrier and the downlink RSRP measurement result of the carrier of the unlicensed spectrum, that is, the terminal device not only considers the channel state of the carrier of the unlicensed spectrum but also considers the coverage of the cell, and then determines the target uplink carrier for sending the target uplink channel. In other words, the terminal device may jointly determine the target uplink carrier according to the measurement result characterizing the channel state of the carrier using the unlicensed spectrum and the measurement result characterizing coverage, so as to select the most reasonable uplink carrier, making full use of the carrier of the unlicensed spectrum, avoiding sending failure of the target uplink channel caused by poor coverage of the unlicensed carrier, and improving the probability of successfully sending the target uplink channel.

Optionally, the method 500 may further include: the terminal device acquires configuration information of a target uplink channel of the carrier using the licensed spectrum and configuration information of a target uplink channel of the carrier using the unlicensed spectrum.

For example, before sending the target uplink channel, the terminal device acquires configuration information of the target uplink channel of the carrier using the licensed spectrum and configuration information of the target uplink channel of the carrier using the unlicensed spectrum.

Preferred implementations of the present application have been described in detail above with reference to the attached drawings, but the present application is not limited to the specific details in the above implementations. Within the technical conception of the present application, various simple variations can be made to the technical solutions of the present application, and these simple variations all fall within the protection scope of the present application.

For example, in Implementation four or Implementation five, the RSSI and RSRP are only an example of the present application, and should not be construed as limitations to the implementations of the present application. In other words, the measurement results in Implementation four or Implementation five may be any measurement results characterizing the channel state of the carrier using the unlicensed spectrum and characterizing coverage.

It should also be understood that various specific technical features described in the above specific implementations can be combined in any suitable way without conflicts. In order to avoid unnecessary repetition, the present application will not explain any possible combination ways separately.

It should also be understood that different implementations of the present application can be combined arbitrarily, as long as they do not violate the idea of the present application, they should also be regarded as contents disclosed in the present application.

For example, Implementation three may be further combined with Implementation four or Implementation five. For example, after it is determined that the carrier of the unlicensed spectrum is used to send the target uplink channel according to the method of Implementation four or Implementation five, if the number of failures of the LBT is greater than a certain number, it is still needed to switch to the carrier of the licensed spectrum to send the target uplink channel.

It should be understood that sequence numbers of the foregoing processes do not mean execution sequences in various method implementations of the present application. The execution sequences of the processes should be determined according to functions and internal logic of the processes, and should not be construed as any limitation on the implementation processes of the implementations of the present application.

Method implementations of the present application are described in detail above in combination with FIGS. 1 to 9. Apparatus implementations of the present application are described in detail below in combination with FIGS. 10 to 13.

Figure 10:
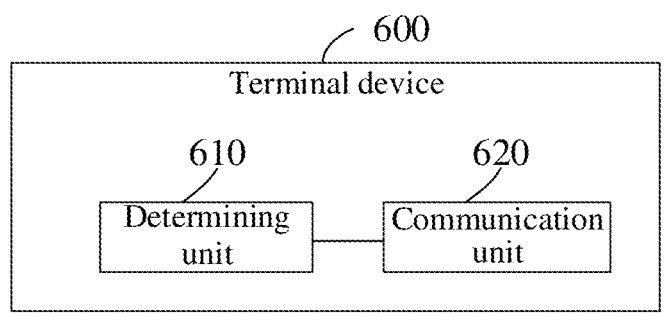
FIG. 10 is a schematic block diagram of a terminal device according to an implementation of the present application.

FIG. 10 is a schematic block diagram of a terminal device 600 according to an implementation of the present application.

Specifically, as shown in FIG. 10, the terminal device 600 may include a determining unit 610 and a communication unit 620.

The determining unit 610 is configured to determine a carrier using a licensed spectrum or a carrier using an unlicensed spectrum as a target uplink carrier.

The communication unit 620 is configured to send a target uplink channel on the target uplink carrier.

Optionally, the determining unit 610 is specifically configured to determine the target uplink carrier according to a first rule.

Optionally, the first rule includes a first channel of a carrier using a licensed spectrum and/or a second channel of a carrier using an unlicensed spectrum; and the first channel includes at least one of a physical random access channel (PRACH), a physical uplink control channel (PUCCH), a sounding reference signal (SRS) and a scheduling request (SR), and the second channel includes a physical uplink shared channel (PUSCH).

Optionally, the first channel includes the target uplink channel; herein the determining unit 610 is specifically configured to determine the carrier using the licensed spectrum as the target uplink carrier.

Optionally, the communication unit 620 is further configured to receive first indication information, wherein the first indication information is used for indicating that an uplink carrier of the terminal device includes the carrier using the licensed spectrum and the carrier using the unlicensed spectrum.

Optionally, the communication unit 620 is specifically configured to receive system information, wherein the system information includes the first indication information.

Optionally, the communication unit 620 is further configured to receive second indication information; and the determining unit 610 is specifically configured to determine the target uplink carrier in the carrier using the licensed spectrum and the carrier using the unlicensed spectrum according to the second indication information, herein the second indication information is used for indicating that the target uplink carrier is the carrier using the licensed spectrum or the carrier using the unlicensed spectrum.

Optionally, the communication unit 620 is specifically configured to receive system information sent by a network device, wherein the system information includes the second indication information.

Optionally, the system information is a master information block (MIB).

Optionally, the second indication information indicates that the target uplink carrier is the carrier using the licensed spectrum or the carrier using the unlicensed spectrum through a spare bit in occupied bits of the MIB.

Optionally, the second indication information indicates that the target uplink carrier is the carrier using the licensed spectrum or the carrier using the unlicensed spectrum through a reserved bit in occupied bits of layer 1 information of the MIB.

Optionally, the system information is a system information block (SIB).

Optionally, the SIB includes configuration information of the target uplink channel, and the configuration information includes the second indication information.

Optionally, the determining unit 610 is specifically configured to determine the carrier using the unlicensed spectrum as the target uplink carrier.

Optionally, the communication unit 620 is specifically configured to send the target uplink channel on the target uplink carrier according to a channel access situation of the target uplink carrier.

Optionally, the communication unit 620 is further specifically configured to send the target uplink channel on the target uplink carrier when the terminal device performs an Listen before Talk (LBT) on the target uplink carrier successfully.

Optionally, the determining unit 610 is further configured to re-determine the carrier using the licensed spectrum as the target uplink carrier when the number of failures of the LBT performed by the terminal device on the target uplink carrier is greater than or equal to a first threshold; and send the target uplink channel on the re-determined target uplink carrier.

Optionally, the determining unit 610 is further configured to determine the carrier using the unlicensed spectrum as the target uplink carrier for sending the target uplink channel next time after successfully sending the target uplink channel on the re-determined target carrier.

Optionally, the first threshold is a preconfigured threshold, or the first threshold is a threshold configured by a network device.

Optionally, the determining unit 610 is specifically configured to determine the target uplink carrier according to a channel measurement result of the carrier using the unlicensed spectrum.

Optionally, the determining unit 610 is further specifically configured to determine the target uplink carrier by comparing a received signal strength indication (RSSI) of the carrier using the unlicensed spectrum with a second threshold.

Optionally, the second threshold is a preconfigured threshold, or the second threshold is a threshold configured by a network device.

Optionally, the determining unit 610 is further specifically configured to determine the target uplink carrier by comparing a received reference signal receiving power (RSRP) of the carrier using the unlicensed spectrum with a third threshold.

Optionally, the third threshold is a preconfigured threshold, or the third threshold is a threshold configured by a network device.

Optionally, the communication unit 620 is further configured to acquire configuration information of the target uplink channel of the carrier using the licensed spectrum and configuration information of the target uplink channel of the carrier using the unlicensed spectrum.

Figure 11:
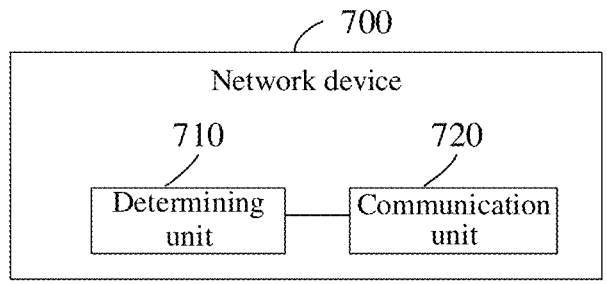
FIG. 11 is a schematic block diagram of a network device according to an implementation of the present application.

FIG. 11 is a schematic block diagram of a network device 700 according to an implementation of the present application.

Specifically, as shown in FIG. 11, the network device 700 includes a determining unit 710 and a communication unit 720.

The determining unit 710 is configured to determine a carrier using a licensed spectrum or a carrier using an unlicensed spectrum as a target uplink carrier.

The communication unit 720 is configured to receive a target uplink channel sent by a terminal device on the target uplink carrier.

Optionally, the determining unit 710 is specifically configured to determine the target uplink carrier according to a first rule.

Optionally, the first rule includes a first channel of a carrier using a licensed spectrum and/or a second channel of a carrier using an unlicensed spectrum; and the first channel includes at least one of a physical random access channel (PRACH), a physical uplink control channel (PUCCH), a sounding reference signal (SRS) and a scheduling request (SR), and the second channel includes a physical uplink shared channel (PUSCH).

Optionally, the first channel includes the target uplink channel; and the determining unit 710 is further specifically configured to determine the carrier using the licensed spectrum as the target uplink carrier.

Optionally, the communication unit 720 is further configured to generate first indication information, herein the first indication information is used for indicating that an uplink carrier of the terminal device includes a carrier using a licensed spectrum and a carrier using an unlicensed spectrum; and send the first indication information to the terminal device.

Optionally, the communication unit 720 is specifically configured to send system information to the terminal device, wherein the system information includes the first indication information.

Optionally, the determining unit 710 is specifically configured to generate second indication information; and send the second indication information to the terminal device, herein the second indication information is used for indicating that the target uplink carrier is the carrier using the licensed spectrum or the carrier using the unlicensed spectrum.

Optionally, the communication unit 720 is specifically configured to send system information to the terminal device, wherein the system information includes the second indication information.

Optionally, the system information is a master information block (MIB).

Optionally, the second indication information indicates that the target uplink carrier is the carrier using the licensed spectrum or the carrier using the unlicensed spectrum through a spare bit in occupied bits of the MIB.

Optionally, the second indication information indicates that the target uplink carrier is the carrier using the licensed spectrum or the carrier using the unlicensed spectrum through a reserved bit in occupied bits of layer 1 information of the MIB.

Optionally, the system information is a system information block (SIB).

Optionally, the SIB includes configuration information of the target uplink channel, and the configuration information includes the second indication information.

Optionally, the determining unit 710 is specifically configured to determine the carrier using the unlicensed spectrum as the target uplink carrier.

Optionally, the communication unit 720 is further configured to send configuration information of a target uplink channel on the carrier of the licensed spectrum and configuration information of a target uplink channel on the carrier of the unlicensed spectrum.

It should be understood that the apparatus implementations may correspond to the method implementations with each other, and description of the method implementations may be referred to for similar description of the apparatus implementations. Specifically, the terminal device 600 shown in FIG. 10 and the network device 700 shown in FIG. 11 may respectively correspond to the corresponding subjects performing the methods of the implementations of the present application, and the aforementioned and other operations and/or functions of various units are respectively for implementing the corresponding processes in various methods, which is not repeated here again for the sake of brevity.

In the above, the communication device according to an implementation of the present application is described from the perspective of functional modules with reference to FIG. 10 and FIG. 11. It should be understood that the functional module may be realized in form of hardware, or instructions in form of software, or a combination of hardware and software modules.

Specifically, each act of the method implementations in the implementations of the present application can be implemented by hardware integrated logic circuits and/or instructions in the form of software in a processor, and the acts of methods disclosed with reference to the implementations of the present application may be directly executed and implemented by a hardware decoding processor, or may be implemented by a combination of hardware and software modules in the decoding processor.

Optionally, the software modules may be located in a storage medium commonly used in the art, such as a random access memory, a flash memory, a read-only memory, a programmable read-only memory, an electrically erasable programmable memory, or a register, etc. The storage medium is located in the memory, and the processor reads information in the memory and completes the acts of the above method implementations in combination with its hardware.

For example, in the implementations of the present application, the above-mentioned determining module may be implemented by a processor, and the above-mentioned communication module may be implemented by a transceiver.

Figure 12:
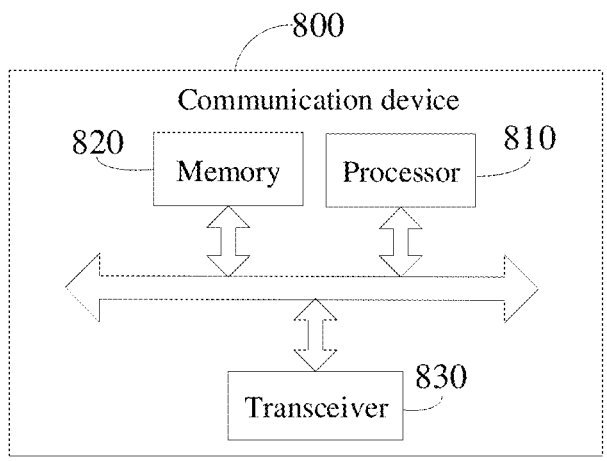
FIG. 12 is a schematic block diagram of a communication device according to an implementation of the present application.

FIG. 12 is a schematic diagram of a structure of a communication device 800 according to an implementation of the present application. A communication device 800 shown in FIG. 12 includes a processor 810. The processor 810 may call and run a computer program from a memory to implement the method in the implementation of the present application.

Optionally, as shown in FIG. 12, the communication device 800 may further include a memory 820. The memory 820 may be configured to store indication information, or may be configured to store codes, instructions, etc., executed by the processor 810. Herein, the processor 810 may call and run a computer program from the memory 820 to implement the method in the implementation of the present application.

Herein, the memory 820 may be a separate device independent of the processor 810 or may be integrated in the processor 810.

Optionally, as shown in FIG. 12, the communication device 800 may further include a transceiver 830, and the processor 810 may control the transceiver 830 to communicate with another device. Specifically, information or data may be sent to another device or information or data sent by another device may be received.

Herein, the transceiver 830 may include a transmitter and a receiver. The transceiver 830 may also further include antennas, wherein a quantity of antennas may be of one or more.

Optionally, the communication device 800 may be a terminal device according to an implementation of the present application, and the communication device 800 may implement corresponding processes implemented by the terminal device in various methods of the implementation of the present application, that is to say, the communication device 800 according to the implementation of the present application may correspond to the terminal device 600 in the implementation of the present application, and may correspond to the corresponding subject performing the methods according to the implementations of the present application, which is not repeated here again for the sake of brevity.

Optionally, the communication device 800 may be a network device according to an implementation of the present application, and the communication device 800 may implement corresponding processes implemented by the network device in various methods of implementations of the present application. That is to say, the communication device 800 in the implementation of the present application may correspond to the network device 700 in the implementation of the present application, and may correspond to a corresponding subject performing the methods in the implementations of the present application, which is not repeated here again for the sake of brevity.

It should be understood that the various components in the communication device 800 are connected through a bus system. In addition to a data bus, the bus system further includes a power bus, a control bus, a status signal bus, etc.

In addition, an implementation of the present application further provides a chip, which may be an integrated circuit chip with a signal processing capability, and can implement or execute the methods, acts and logic block diagrams disclosed in the implementations of the present application.

Optionally, the chip may be applied to various communication devices, so that the communication devices with the chip installed therein can perform the disclosed methods, acts and logic block diagrams in the implementations of the present application.

Figure 13:
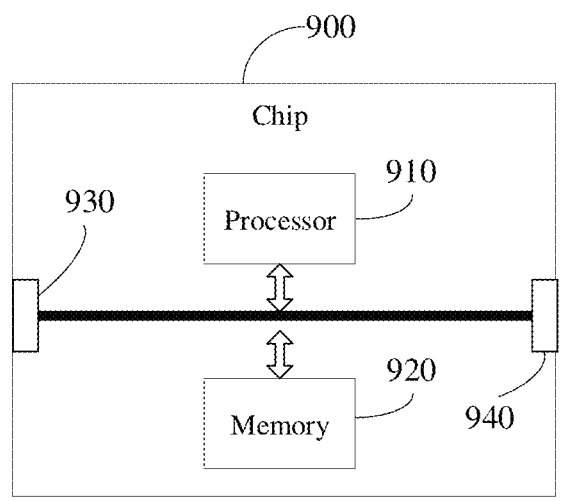
FIG. 13 is a schematic block diagram of a chip according to an implementation of the present application.

FIG. 13 is a schematic diagram of a structure of a chip according to an implementation of the present application.

A chip 900 shown in FIG. 13 includes a processor 910. The processor 910 may call and run a computer program from a memory to implement the method in the implementation of the present application.

Optionally, as shown in FIG. 13, the chip 900 may further include a memory 920. Herein, the processor 910 may call and run a computer program from the memory 920 to implement the method in the implementation of the present application. The memory 920 may be configured to store indication information, or may be configured to store codes, instructions, etc., executed by the processor 910.

Herein, the memory 920 may be a separate device independent of the processor 910 or may be integrated in the processor 910.

Optionally, the chip 900 may further include an input interface 930. Herein, the processor 910 may control the input interface 930 to communicate with another device or chip. Specifically, information or data sent by another device or chip may be acquired.

Optionally, the chip 900 may further include an output interface 940. Herein, the processor 910 may control the output interface 940 to communicate with another device or chip. Specifically, information or data may be outputted to another device or chip.

Optionally, the chip may be applied in a network device of the implementation of the present application, and the chip may implement the corresponding processes implemented by the network device in various methods of the implementation of the present application, which is not repeated here again for brevity.

Optionally, the chip may be applied to a terminal device in an implementation of the present application, and the chip may implement the corresponding processes implemented by the terminal device in various methods of the implementations of the present application, which is not repeated here again for the sake of brevity.

It should be understood that the chip mentioned in the implementation of the present application may also be referred to as a system-level chip, a system chip, a chip system or a system chip-on-chip, etc. It should also be understood that, various components in the chip 900 are connected through a bus system, herein, in addition to a data bus, the bus system further includes a power bus, a control bus and a state signal bus.

The processor may include, but is not limited to: a general purpose processor, a Digital Signal Processor (DSP), an Application Specific Integrated Circuit (ASIC), a Field Programmable Gate Array (FPGA), or another programmable logic device, a discrete gate or a transistor logic device, or a discrete hardware component, etc.

The processor may be configured to implement or perform methods, acts and logical block diagrams disclosed in the implementations of the present application. The acts of the method disclosed with reference to the implementation of the present application may be directly embodied as being executed and accomplished by a hardware decoding processor, or being executed and accomplished by a combination of hardware and software modules in a decoding processor. The software modules may be located in a storage medium commonly used in the art, such as a random access memory, a flash memory, a read-only memory, a programmable read-only memory or an erasable programmable memory, a register, etc. The storage medium is located in a memory, and the processor reads information in the memory and accomplishes the acts of the above method in combination with hardware thereof.

The memory includes but is not limited to: volatile memory and/or nonvolatile memory. Herein, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. Through an exemplary but not limitative description, many forms of RAMs may be used, for example, a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM), and a Direct Rambus RAM (DRRAM).

It should be noted that memories in the systems and methods described in this specification are intended to include, but are not limited to, these memories and any memory of another proper type.

An implementation of the present application further provides a computer readable storage medium, configured to store a computer program. The computer readable storage medium stores one or more programs including instructions that, when executed by a portable electronic device including multiple application programs, enable the portable electronic device to perform the method of an implementation shown in the method.

Optionally, the computer readable storage medium may be applied in a network device of the implementation of the present application, and the computer program causes a computer to perform the corresponding processes implemented by the network device in various methods of the implementations of the present application, which will not be repeated here again for brevity.

Optionally, the computer readable storage medium may be applied in a mobile terminal/terminal device of the implementation of the present application, and the computer program causes a computer to perform the corresponding processes implemented by the mobile terminal/terminal device in various methods of the implementations of the present application, which is not repeated here again for brevity.

An implementation of the present application further provides a computer program product, including a computer program.

Optionally, the computer program product may be applied in a network device of an implementation of the present application, and the computer program enables the computer to perform the corresponding processes implemented by the network device in various methods of implementations of the present application, which is not repeated here again for the sake of brevity.

Optionally, the computer program product may be applied in a mobile terminal/terminal device of an implementation of the present application, and the computer program enables the computer to perform the corresponding processes implemented by the mobile terminal/terminal device in various methods of implementations of the present application, which is not repeated here again for the sake of brevity.

An implementation of the present application further provides a computer program. When the computer program is executed by a computer, the computer is enabled to perform the method of an implementation shown in the method.

Optionally, the computer program may be applied in a network device of the implementation of the present application. When the computer program is run on a computer, the computer is caused to perform the corresponding processes implemented by the network device in various methods of the implementations of the present application, which will not be repeated here again for brevity.

An implementation of the present application further provides a communication system, which may include the above-mentioned terminal device and network device, which are respectively used to implement the corresponding functions in the method implementation, and is not repeated here again for brevity.

It should be noted that the term "system" in this specification may also be referred to as "network management architecture" or "network system", etc.

It should also be understood that the terms used in implementations of the present application and the appended claims are for the purpose of describing specific implementations only but are not intended to limit implementations of the present application.

For example, the singular forms "a", "said", "the above" and "the" used in the implementations of the present application and the appended claims are also intended to include the plural forms unless the context clearly indicates other meanings.

Those skilled in the art may recognize that the exemplary elements and algorithm acts described in combination with the implementations disclosed herein can be implemented in electronic hardware, or a combination of computer software and electronic hardware. Whether these functions being executed in a hardware or software mode depend on a specific application and design constraint condition of the technical solution. Those skilled in the art may use different methods to implement the described functions in respect to each particular application, but such realization should not be considered to be beyond the scope of implementations of the present application.

The function units may be stored in a computer readable storage medium if realized in a form of software functional units and sold or used as a separate product. Based on this understanding, the technical solution of implementations of the present application, in essence, or the part contributing to the existing art, or a part of the technical solution, may be embodied in a form of a software product. The computer software product is stored in a storage medium, including a number of instructions for enabling a computer device (which may be a personal computer, a server, or a network device, or the like.) to perform all or part of the acts of the methods described in various implementations of the present application. And the aforementioned storage medium includes various kinds of media that may store program codes, such as a USB flash disk, a removable hard disk, a Read-Only Memory (ROM), a Random Access Memory (RAM), a magnetic disk or an optical disk, etc.

Those skilled in the art may clearly learn that for convenience and conciseness of description, specific working processes of the systems, the apparatuses and the units described above may refer to the corresponding processes in the aforementioned method implementations, which will not be repeated here again for brevity.

In several implementations provided by the present application, it should be understood that the disclosed systems, devices and methods may be implemented in another mode.

For example, the division of the units, modules or components in the above-mentioned device implementations is only a logical function division, and there may be another division mode in an actual realization. For example, multiple units, modules or components may be combined or integrated into another system, or some units or components may be ignored or not executed.

For another example, the units/modules/components described above as separate/display components may or may not be physically separated, i.e., they may be located in one place or may be distributed over multiple network units. Part or all of the units/modules/components therein may be selected according to an actual requirement to achieve a purpose of a solution the implementations of the present application.

Finally, it should be noted that the mutual coupling or direct coupling or communication connection shown or discussed in the above may be indirect coupling or communication connection through some interface, apparatus or unit, and may be in electrical, mechanical or other forms.

What are described above are merely specific implementations of the present application, but the protection scope of implementations of the present application is not limited thereto. Any variation or substitution that may be easily conceived by a person skilled in the art within the technical scope disclosed by the present application shall be included within the protection scope of the present application. Therefore, the protection scope of the implementations of the present application shall be determined by the protection scope of the claims.

What we claim is:

1. A method for wireless communication, comprising:
   determining, by a terminal device, a carrier using a licensed spectrum or a carrier using an unlicensed spectrum as a target uplink carrier; and
   sending, by the terminal device, a target uplink channel on the target uplink carrier;
   wherein determining, by the terminal device, the carrier using the licensed spectrum or the carrier using the unlicensed spectrum as the target uplink carrier comprises:
   receiving, by the terminal device, first indication information, wherein the first indication information is used for indicating that uplink carriers of the terminal device comprises the carrier using the licensed spectrum and the carrier using the unlicensed spectrum; and
   determining, by the terminal device, the target uplink carrier according to a first rule;
   wherein receiving, by the terminal device, the first indication information, comprises:
   receiving, by the terminal device, system information, wherein the system information comprises the first indication information;
   or
   wherein determining, by the terminal device, the carrier using the licensed spectrum or the carrier using the unlicensed spectrum as the target uplink carrier comprises:
   receiving, by the terminal device, second indication information; and
   determining, by the terminal device, the target uplink carrier in the carrier using the licensed spectrum and the carrier using the unlicensed spectrum according to the second indication information, wherein the second indication information is used for indicating that the target uplink carrier is the carrier using the licensed spectrum or the carrier using the unlicensed spectrum.

2. The method of claim 1, wherein determining, by the terminal device, the carrier using the licensed spectrum or the carrier using the unlicensed spectrum as the target uplink carrier comprises:
   determining, by the terminal device, the target uplink carrier according to a channel measurement result of the carrier using the unlicensed spectrum.

3. The method of claim 2, wherein determining, by the terminal device, the target uplink carrier according to the channel measurement result of the carrier using the unlicensed spectrum comprises:
   determining, by the terminal device, the target uplink carrier by comparing received Reference Signal Receiving Power (RSRP) of the carrier using the unlicensed spectrum with a third threshold.

4. The method of claim 3, wherein the third threshold is a preconfigured threshold, or the third threshold is a threshold configured by a network device.

5. The method of claim 1, wherein the method further comprises:
   acquiring, by the terminal device, configuration information of the target uplink channel of the carrier using the licensed spectrum and configuration information of the target uplink channel of the carrier using the unlicensed spectrum.

6. A method for wireless communication, comprising:
determining, by a network device, a carrier using a licensed spectrum or a carrier using an unlicensed spectrum as a target uplink carrier; and
receiving, by the network device, a target uplink channel sent by a terminal device on the target uplink carrier;
wherein determining, by the network device, the carrier using the licensed spectrum or the carrier using the unlicensed spectrum as the target uplink carrier comprises:
generating, by the network device, first indication information, wherein the first indication information is used for indicating that uplink carriers of the terminal device comprises the carrier using the licensed spectrum and the carrier using the unlicensed spectrum;
sending, by the network device, the first indication information to the terminal device; and
determining, by the network device, the target uplink carrier according to a first rule;
wherein sending, by the network device, the first indication information to the terminal device comprises:
sending, by the network device, system information to the terminal device, wherein the system information comprises the first indication information;
or
wherein determining, by the network device, the carrier using the licensed spectrum or the carrier using the unlicensed spectrum as the target uplink carrier comprises:
generating, by the network device, second indication information; and
sending, by the network device, the second indication information to the terminal device, wherein the second indication information is used for indicating that the target uplink carrier is the carrier using the licensed spectrum or the carrier using the unlicensed spectrum.

7. A terminal device, comprising a memory and a processor, wherein the processor is configured to execute instructions stored in the memory to perform the following operations:
determining a carrier using a licensed spectrum or a carrier using an unlicensed spectrum as a target uplink carrier; and
send a target uplink channel on the target uplink carrier;
wherein the processor is further configured to execute instructions stored in the memory to perform the following operations:
receiving, by the terminal device, first indication information, wherein the first indication information is used for indicating that uplink carriers of the terminal device comprises the carrier using the licensed spectrum and the carrier using the unlicensed spectrum;
receiving system information, wherein the system information comprises the first indication information; and
determining by the terminal device, the target uplink carrier according to a first rule;
or
wherein the processor is further configured to execute instructions stored in the memory to perform the following operations: receiving, by the terminal device, second indication information; and
determining, by the terminal device, the target uplink carrier in the carrier using the licensed spectrum and the carrier using the unlicensed spectrum according to the second indication information, wherein the second indication information is used for indicating that the target uplink carrier is the carrier using the licensed spectrum or the carrier using the unlicensed spectrum.

8. The terminal device of claim 7, wherein the processor is further configured to execute instructions stored in the memory to perform following operation:
determining the target uplink carrier according to a channel measurement result of the carrier using the unlicensed spectrum.

9. The terminal device of claim 8, wherein the processor is further configured to execute instructions stored in the memory to perform following operation:
determining the target uplink carrier by comparing received Reference Signal Receiving Power (RSRP) of the carrier using the unlicensed spectrum with a third threshold; wherein the third threshold is a preconfigured threshold, or the third threshold is a threshold configured by a network device.

10. A network device, comprising a memory and a processor, wherein the processor is configured to execute instructions stored in the memory to perform following operations:
determining a carrier using a licensed spectrum or a carrier using an unlicensed spectrum as a target uplink carrier; and
receiving a target uplink channel sent by a terminal device on the target uplink carrier; wherein the processor is further configured to execute instructions stored in the memory to perform following operations:
generating first indication information, wherein the first indication information is used for indicating that uplink carriers of the terminal device comprises the carrier using the licensed spectrum and the carrier using the unlicensed spectrum;
sending system information to the terminal device; wherein the system information comprises the first indication information; and
determining, by the network device, the target uplink carrier according to a first rule;
or
wherein the processor is further configured to execute instructions stored in the memory to perform following operations:
generating second indication information; and
sending the second indication information to the terminal device, wherein the second indication information is used for indicating that the target uplink carrier is the carrier using the licensed spectrum or the carrier using the unlicensed spectrum.

* * * * *